(12) United States Patent
Boppana et al.

(10) Patent No.: US 8,032,746 B2
(45) Date of Patent: Oct. 4, 2011

(54) TAMPER-RESISTANT COMMUNICATION LAYER FOR ATTACK MITIGATION AND RELIABLE INTRUSION DETECTION

(75) Inventors: Rajendra V. Boppana, San Antonio, TX (US); William H. Winsborough, San Antonio, TX (US)

(73) Assignee: The University of Texas at San Antonio, San Antonio, TX (US)

( * ) Notice: Subject to any disclaimer, the term of this patent is extended or adjusted under 35 U.S.C. 154(b) by 1068 days.

(21) Appl. No.: 11/820,365

(22) Filed: Jun. 19, 2007

(65) Prior Publication Data
US 2008/0317002 A1  Dec. 25, 2008

(51) Int. Cl.
*H04L 9/32* (2006.01)
(52) U.S. Cl. ........ 713/168; 713/150; 713/151; 713/152; 713/189; 713/190; 713/191; 713/192; 713/193; 713/194; 380/270
(58) Field of Classification Search .............. 726/22–25; 713/150–160, 189–194; 380/270
See application file for complete search history.

(56) References Cited

U.S. PATENT DOCUMENTS

| | | | |
|---|---|---|---|
| 5,412,654 A | | 5/1995 | Perkins |
| 5,577,209 A | | 11/1996 | Boyle et al. |
| 5,832,228 A | | 11/1998 | Holden et al. |
| 6,266,704 B1 * | | 7/2001 | Reed et al. ............ 709/238 |
| 6,931,132 B2 | | 8/2005 | Billhartz et al. |
| 6,986,036 B2 * | | 1/2006 | Wang et al. ............ 713/153 |
| 7,113,790 B2 | | 9/2006 | Athalye |
| 7,346,167 B2 * | | 3/2008 | Billhartz et al. ............ 380/270 |
| 2002/0032853 A1 | | 3/2002 | Preston et al. |
| 2004/0025018 A1 * | | 2/2004 | Haas et al. ............ 713/168 |
| 2004/0088567 A1 * | | 5/2004 | Lamotte ............ 713/200 |
| 2004/0103275 A1 | | 5/2004 | Ji et al. |
| 2005/0025172 A1 | | 2/2005 | Frankel |
| 2005/0025182 A1 | | 2/2005 | Nazari |
| 2005/0030921 A1 | | 2/2005 | Yau |
| 2005/0036616 A1 | | 2/2005 | Huang et al. |
| 2005/0053094 A1 | | 3/2005 | Cain et al. |
| 2005/0059379 A1 * | | 3/2005 | Sovio et al. ............ 455/411 |

(Continued)

OTHER PUBLICATIONS

Song et al., Secure Routing with Tamper Resistant Module for Mobile Ad Hoc Networks, Mobile Computing and Communications Review, V7, No. 3, 2003.*

(Continued)

*Primary Examiner* — Nabil El Hady
(74) *Attorney, Agent, or Firm* — Jackson Walker L.L.P.; Christopher J. Rourk

(57) ABSTRACT

A Tamper-Resistant Communication layer (TRC) adapted to mitigate ad hoc network attacks launched by malicious nodes is presented. One embodiment of the invention utilizes TRC, which is a lean communication layer placed between a network layer and the link layer of a network protocol stack. All aspects of the network protocol stack, with the exception of the routing protocol and data packet forwarding mechanism in the network layer, are unchanged. TRC takes charge of certain key functions of a routing protocol in order to minimize network attacks. Additionally, TRC implements highly accurate self-monitoring and reporting functionality that can be used by nodes in the network to detect compromised nodes. TRC of a node controls its ability to communicate with other nodes by providing non-repudiation of communications. The tamper-resistant nature of TRC provides high assurance that it cannot be bypassed or compromised.

7 Claims, 12 Drawing Sheets

U.S. PATENT DOCUMENTS

| | | |
|---|---|---|
| 2005/0141706 A1* | 6/2005 | Regli et al. .................. 380/44 |
| 2005/0174961 A1 | 8/2005 | Hrastar |
| 2005/0195814 A1* | 9/2005 | Hagiwara et al. ............ 370/389 |
| 2006/0121854 A1 | 6/2006 | Abhishek et al. |
| 2006/0126845 A1 | 6/2006 | Zheng |
| 2006/0198394 A1 | 9/2006 | Gotoh et al. |
| 2006/0253894 A1 | 11/2006 | Bookman et al. |
| 2007/0204346 A1* | 8/2007 | Meier .......................... 726/25 |
| 2007/0271458 A1* | 11/2007 | Bosch et al. ................ 713/168 |

OTHER PUBLICATIONS

Buttyan et al., Enforcing Service Availability in Mobile Ad-Hoc WANs, 1st. IEEE/ACM Workshop on Mobile Ad Hoc Networking and Computing, 2000.*

M. Just, E. Kranakis, and T. Wan, "Resisting Malicious Packet Dropping in Wireless Ad-Hoc Networks," In Proceedings of 2nd Annual Conference on Adhoc Networks and Wireless (ADHOC-NOW'03), Oct. 2003, pp. 151-163, Springer-Verlag, Berlin, Germany.

J. Kong, X. Hong, Y. Yi, J.-S. Park, J. Liu, and M. Gerla, "A Secure Ad-Hoc Routing Approach Using Localized Self-Healing Communities." In Proceedings of ACM International Symposium on Mobile Ad Hoc Networking and Computing (*MobiHoc'05*), May 25, 2005, pp. 254-265, ACM, USA.

P.F. Syverson, D.M. Goldschlag, and M. G. Reed, Naval Research Laboratory, "Anonymous Connections and Onion Routing." In IEEE Symposium of Security and Privacy, 1997, pp. 1-11, IEEE, USA.

Y. Zhang, W. Lee, and Y-A. Huang, "Intrusion Detection Techniques for Mobile Wireless Networks." Wireless Networks, 2003, pp. 545-556, No. 9, Kluwer Academic Publishers, The Netherlands.

B. Schneier and J. Kelsey, "Secure Audit Logs to Support Computer Forensics." ACM Transactions on Information and System Security, May 1999, pp. 159-176, vol. 2, No. 2, ACM, USA.

J.G. Dyer et al., "Building the IBM 4758 Secure Coprocessor." IEEE Computer, Oct. 2001, pp. 57-66, vol. 34, IEEE, USA.

C. Chong, Z. Peng, and P. Hartel, "Secure Audit Logging with Tamper Resistant Hardware." Technical report TR-CTIT-02-29, Aug. 2002, pp. 1-18, Center for Telematics and Information Technology, University of Twente, Netherlands.

G.E. Suh, et al., "AEGIS: Architecture for Tamper-Evident and Tamper-Resistant Processing." Proceedings of International Conference on Supercomputing (ICS'03), Jun. 23, 2003, pp. 160-171, ACM Press, USA.

Trusted Computing Group, "TCG Specification Architecture Overview," (Trusted Platform Module Specifications) TCG TPM Specification, Mar. 28, 2007, Rev. 1.3, ii-vi, 1-54, Trusted Computing Group, USA.

F. Koeune and F-X. Standaert, "A Tutorial on Physical Security and Side-Channel Attacks." FOSAD 2004/2005, Lecture Notes in Computer Science (LNCS), 2005, pp. 78-108, vol. 3655, Springer-Verlag, Berlin, Germany.

R. Anderson and M. Kuhn, "Low Cost Attacks on Tamper Resistant Devices." Proceedings of International Workshop on Security Protocols, Apr. 7, 1997, pp. 125-136, No. 1361, Springer LNCS, Berlin, Germany.

X. Zhang, et al., "Secure Coprocessor-based Intrusion Detection." Proceedings of the 10th Workshop on ACM SIGOPS European Workshop: Beyond the PC, 2002, pp. 239-242.

X. Su and R.V. Boppana, "On Mitigating In-Band Wormhole Attacks in Mobile Ad Hoc Networks," in In Procs. of IEEE International Conference on Communications (ICC) Jun. 2007.

I. Chlamtac, Marco Conti, and J. J.-N. Liu, "Mobile Ad Hoc Networking: Imperatives and Challenges." *Ad Hoc Networks 1*, 2003, p. 13-64, Elsevier B.V., U.S.A.

C. E. Perkins, E. M. Belding-Royer, and S. R. Das, "Ad Hoc on Demand Distance Vector (AODV) Routing." IETF, Jul. 2003, pp. 1-37, RFC 3561, The Internet Society, U.S.A.

D.B. Johnson, D.A. Maltz and Y.-C. Hu, "The Dynamic Source Routing Protocol for Mobile Ad Hoc Networks (DSR)," Internet-Draft, Apr. 15, 2003, pp. i-v, 1-111, Internet Engineering Task Force MANET Working Group, www.IETF.org, U.S.A.

B. Awerbuch, D. Holmer, C. Nita-Rotaru, and H. Rubens, "An On-Demand Secure Routing Protocol Resilient to Byzantine Failures." In ACM Workshop on Wireless Security (WiSe'02), Sep. 28, 2002, pp. 21-30, ACM, Atlanta, GA, USA.

Deng, W. Li, and D.P. Agrawal, "Routing Security in Wireless Ad Hoc Network." IEEE Communications Magazine, Oct. 2002, pp. 70-75, IEEE, USA.

Y-C. Hu and A. Perrig, "A Survey of Secure Wireless Ad Hoc Routing." IEEE Security & Privacy, May/Jun. 2004, pp. 28-39, IEEE Computer Society, USA.

S. Desilva and R.V. Boppana, "Mitigating Malicious Control Packet Floods in Ad Hoc Networks." IEEE Wireless Communications and Networking Conference (WCNC), Mar. 2005, IEEE, USA.

J.N. Mait, and R.L. Kugler, "Alternative Approaches to Army Transformation," Defense Horizons, Jul. 2004, pp. 1-8, No. 41, Center for Technology and National Security Policy, National Defense University, USA.

M.A. Robinson, "Security Solutions Ride Wi-Fi Wave." SIGNAL Magazine, Aug. 2003. pp. 1-3, Armed Forces Communications and Electronics Association, USA.

E.D. Turnbaugh, "The Next Frontier of Networking—The Airborne Network." Home Page Article, The Air Force Research Lab, May 2006, AFRL.org., USA.

P. Boyle, "Intrusion Detection FAQ: Distributed Denial of Service Attack Tools: trinoo and wintrinoo." Research Report submitted in the SANS GIAC Program, 2000, SANS Institute, USA.

K. Sanzgiri, B. Dahill, B. Levine, C. Shields, and E. Belding-Royer, "A Secure Routing Protocol for Ad Hoc Networks." Proceedings of IEEE International Conference on Network Protocols (ICNP'02), 2002, pp. 1-10, IEEE, USA.

Y-C. Hu, A. Perrig, and D. Johnson, "Rushing Attacks and Defense in Wireless Ad Hoc Network Routing Protocols." in ACM Workshop on Wireless Security, *WiSe 2003*, Sep. 19, 2003, ACM, USA.

Y.-C. Hu, A. Perrig, and D. Johnson, "Packet Leashes: A Defense Against Wormhole Attacks in Wireless Networks." In Proceedings of IEEE Infocom 2003, 2003, IEEE, USA.

I. AAD, J-P. Hubaux, and E.W. Knightly, "Denial of Service Resilience in Ad Hoc Networks." In Proceedings of ACM MOBICOM Wireless Security Workshop (WiSe), *MobiCom'04*, Sep. 26-Oct. 1, 2004, ACM, USA.

Y.-C. Hu, A. Perrig, and D. Johnson, "Ariadne: A Secure On-Demand Routing Protocol for Ad Hoc Networks." Wireless Networks, 2005, pp. 21-38, No. 11, Springer Science + Business Media, Inc., The Netherlands.

P. Papadimitratos and Z. Haas, "Secure Routing for Mobile Ad Hoc Networks" In Proceedings of the SCS Communication Networks and Distributed Systems Modeling and Simulation Conference (CNDS 2002), Jan. 2002, pp. 1-13, The Society for Modeling and Simulation International (SCS), USA.

M. Zapata, "Secure Ad Hoc On-Demand Distance Vector (SAODV) Routing." In Mobile Ad Hoc Networking Working Group, Aug. 12, 2001, pp. 1-14, Internet Draft, The Internet Engineering Task Force, USA.

S. Marti, T. J. Giuli, K. Lai, and M. Baker, "Mitigating Routing Misbehavior in Mobile Ad Hoc Networks." In Mobile Computing and Networking, 2000, ACM SIGMOBILE, USA.

V.N. Padmanabhan and D.R. Simon, "Secure Traceroute to Detect Faulty or Malicious Routing." ACM SIGCOMM Computer Communications Review, Jan. 2003, pp. 77-82, vol. 33, No. 1, ACM, USA.

S. Buchegger and J.-Y. Le Boudec, "Performance Analysis of the Confidant Protocol (Cooperation of Nodes: Fairness in Dynamic Ad-Hoc Networks)" In Proceedings of IEEE/ACM Symposium on Mobile Ad Hoc Networking and Computing (*MOBIHOC'02*), 2002, Jun. 9, 2002, pp. 228-236, ACM, USA.

* cited by examiner

TAMPER-RESISTANT COMMUNICATION LAYER FOR ATTACK MITIGATION AND RELIABLE INTRUSION DETECTION

This invention was made with government support under Grant Nos. CCR0325951 and EIA0017255 awarded by the National Science Foundation. The government has certain rights in the invention.

FIELD OF THE INVENTION

The present invention is generally related to ad hoc networking, and more specifically to ad hoc network security.

BACKGROUND OF THE INVENTION

A wireless ad hoc network is formed by a collection of mobile communication devices such as Personal Digital Assistants (PDAs), laptops, and/or Wireless Fidelity (Wi-Fi) routers without the aid of an existing network infrastructure. Ad hoc networks are used to aid, for example, military operations and emergency rescue efforts of large disaster areas. The communicating nodes in an ad hoc network typically use common wireless technologies such as Wi-Fi and peer-to-peer communication techniques. Therefore, each node in an ad hoc network may act as an end host as well as a router handling communication for nodes that are too far away from each other to communicate directly. In contrast, the current Internet is designed using hierarchical communication techniques with most computers functioning as end hosts and with communication among these facilitated by network routers, which are often under the control of trained network administrators.

An ad hoc network may consist of several hundred mobile nodes, some of which may become compromised by an enemy. A capable enemy can corrupt the network software of one or more nodes by using hacker attacks, even without capturing the nodes physically. These nodes then become malicious insiders, since they were normal nodes before being compromised, and thus have all the cryptographic keys required to behave as normal nodes. Traditional cryptographic techniques are insufficient to prevent such malicious insider nodes from launching coordinated attacks either to disrupt the network completely, or at least significantly degrade the network's ability to deliver packets among uncompromised nodes.

Owing to node mobility and unpredictable nature of wireless links, the network topology and, hence, the routes in an ad hoc network change frequently. Wireless transmissions make passive eavesdropping easy to achieve. Since each node participates in the network's management and operation by cooperating in the identification of routes and disseminating notification of broken routes, it is easier for malicious nodes to launch various types of attacks and thereby to render the network unusable. Be they moles or normal nodes compromised by hacker attacks during live operation, malicious insider nodes can launch attacks that are particularly difficult to contain. This is because such nodes typically have access to all the cryptographic keys required for them to participate undetected in normal communications, which enables them to launch Byzantine attacks that adaptively target the most critical points (in time or in space) of network operation. Simulation studies have shown that even a single malicious node attacking existing ad hoc routing protocols can reduce the network performance by a third or more.

Several well-known attacks on wired networks, the Internet and Local Area Networks (LANs), exploit vulnerabilities in transport layer protocols, such as Transport Control Protocol (TCP), and computer operating systems (OSs). In the context of ad hoc networks, both the attacks and the solutions developed to mitigate them for wired networks are applicable. Therefore, the present invention considers attacks specific to wireless networks, targeting network, routing and link layer protocols. Attacks on link layer protocols often involve modification of the Medium Access Control (MAC) protocol and using disproportionately more channel bandwidth.

Security attacks on ad hoc networks may be launched by "outsider" nodes that do not have necessary cryptographic keys to decipher the contents of transmission, or by "insider" nodes, nodes assumed to be normal nodes, that have been compromised. Outsider attackers can jam radio signals, eavesdrop and learn traffic patterns, or replay transmissions originating in one region of the network in another region, which can lead to false routes containing "wormholes." These can be countered using anti jamming radio transmission techniques, multiple node-disjoint paths to deliver data packets, and bounding packet hop times and distances. However, the attacks launched by malicious insider nodes exploiting vulnerabilities in Route Discovery (RD), Route Maintenance (RM), and Data Forwarding (DF) in the network layer are insidious and hard to mitigate.

SUMMARY OF INVENTION

The present invention achieves technical advantages as a Tamper-Resistant Communication layer (TRC) adapted to mitigate ad hoc network attacks launched by malicious nodes. One exemplary embodiment of the invention utilizes the TRC, which is a lean communication layer placed between a network layer and the link layer of a network protocol stack. All aspects of the network protocol stack, with the exception of the routing protocol and data packet forwarding mechanism in the network layer, are unchanged. The new layer ensures that the crucial data packet forwarding functionality of the network is difficult to compromise, while at the same time, allowing future improvements/changes in network interface cards (NICs) and routing protocols to be incorporated easily.

TRC comprises certain key functions from a routing protocol in order to minimize network attacks. Additionally, TRC implements highly accurate self-monitoring and reporting functionality that can be used by nodes in the network to detect compromised nodes. TRC of a node controls its ability to communicate with other nodes by providing non-repudiation of communications. Together the tamper-resistant nature of TRC and the cryptographic techniques used to encrypt and authenticate communication between TRCs provide high assurance that it cannot be by-passed or compromised.

DETAILED DESCRIPTION OF THE PRESENT INVENTION

Figure 1:
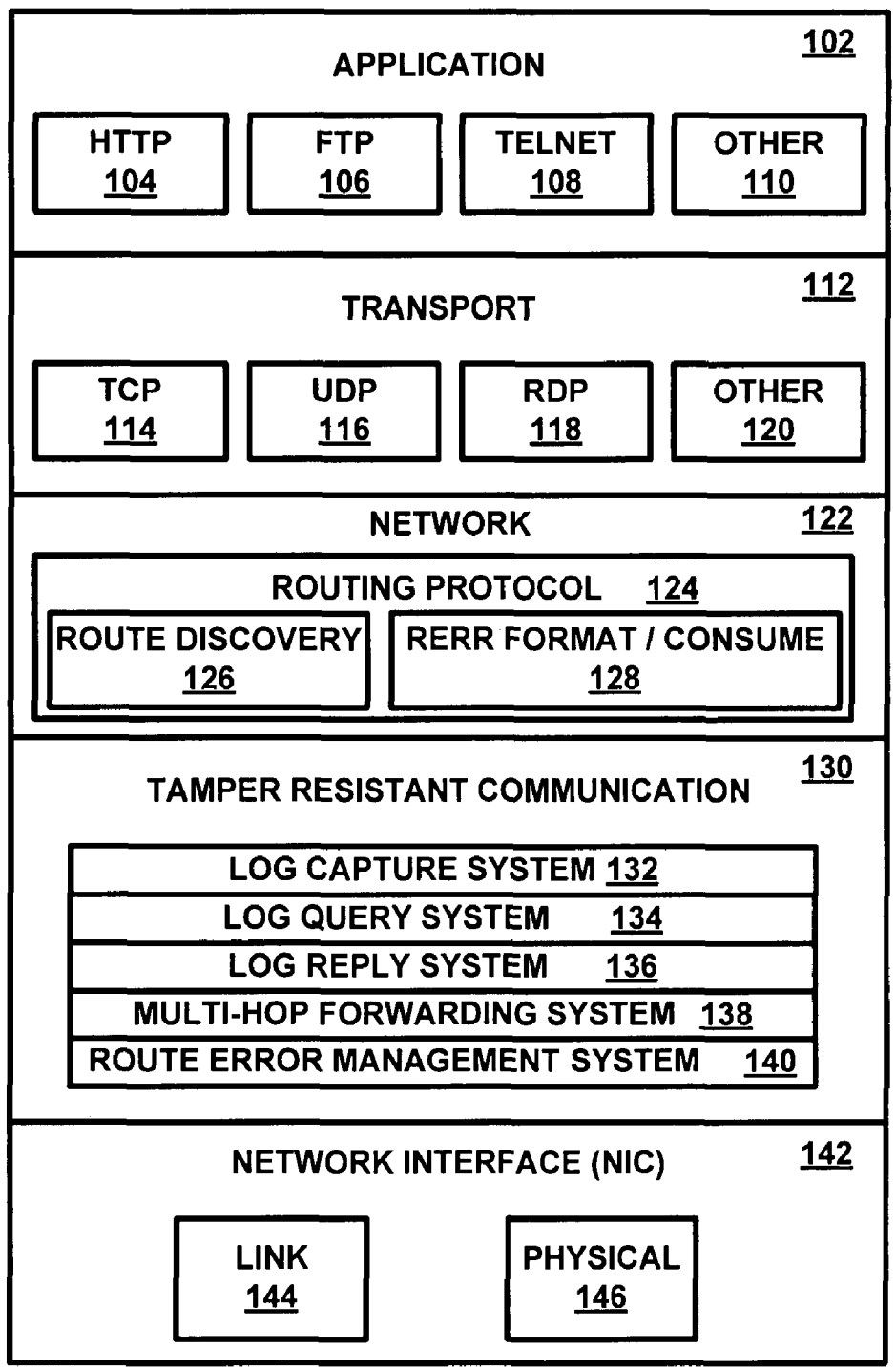
FIG. 1 is a diagram of a network protocol stack with a Tamper-Resistant Communication layer in accordance with an exemplary embodiment of the present invention.

The present invention makes it extremely hard, if not impossible, for malicious insider nodes to surreptitiously compromise network operation. It does this in two ways. First, it provides support to secure routing protocols needed to make it very hard to launch attacks in the first place. Second, it enables intrusion detection techniques (IDTs) to detect any such attacks quickly, reliably, and with low-overhead. Therefore, the network security mechanisms proposed in the invention can be used with little impact on normal network performance. If a compromised node somehow manages to gain access to the network, it can be isolated by remotely disabling its TRC.

TRC guarantees accuracy of log data with high assurance by automatically collecting it in the proposed tamper-resistant communication layer, which cannot be compromised by the node's other components. TRC goes far beyond preventing impersonation by providing accurate self monitoring of the nodes. At the same time, the functionality placed in TRC is limited to provide flexibility in incorporating future upgrades to network and medium access control (MAC) protocols. With the use of TRC, however, such updates can be performed in a verifiable and authenticated manner, which is useful in mitigating unforeseen operational conditions.

TRC uses asymmetric public/private key pairs or pair-wise symmetric keys to encrypt or decrypt data/packets. TRC also incorporates a cryptographic processing chip to encrypt and decrypt data and control packets. Pair-wise symmetric keys may be generated on-the-fly using public/private keys. Cryptographic keys are therefore loaded into TRC by the appropriate authority offline. The cryptographic keys stored inside TRC can never be read by outside hardware or software, including the system that loaded the keys into TRC.

To detect modification of the network interface card (NIC), TRC continually monitors its connectivity to the NIC. Whenever contact with the NIC is lost, for instance, if the node is powered down, or the NIC is encountered for the first time, TRC authenticates it using cryptographic techniques with keys different from those used for communication with TRCs in other nodes. This authentication requires the NIC to incorporate a special module to respond to TRC's authentication sequences appropriately. The responses from NIC are a function of its recent communication activity and the cryptographic keys it shares with TRC. This process ensures that an adversary with physical access to the node must continue to use the original NIC for communication.

All transmissions are encrypted and authenticated by sender TRCs using cryptographic keys and they are decrypted and verified by receiver TRCs using the corresponding keys. Therefore, an external attacker that has no valid TRC can neither induce legitimate nodes to forward its transmissions, nor interpret the content of transmissions by legitimate nodes. Any attempt to physically alter TRC will erase the cryptographic keys. In the simplest embodiment, the logs are also erased; however, if the logs are stored in encrypted form, they can be retained, enabling them to be inspected should the node later be recovered.

A typical network protocol stack consists of an application layer, a transport layer, a network layer, a link layer, and a physical layer. The operation of the network protocol stack is well known in the art, and so a detailed description of the layers surrounding the present invention will not be provided.

Referring to FIG. 1, there is shown at 100 a diagram of a network protocol stack with a tamper-resistant communication layer (TRC) in accordance with an exemplary embodiment of the present invention. TRC 130 is a hardware component which enables a network to withstand sophisticated insider attacks while mitigating adverse effects due to degradation of performance. Advantageously, the use of TRC 130 incurs only modest overhead when there is no attack. For example, only network and transport headers need to be encrypted for data packets since the payload is encrypted by the originating application, which can be decrypted by the intended destination application only. On the other hand, entire control and log messages are encrypted by TRC with less energy, instead of network layer software performing this task as in the current secure routing protocols and intrusion detection techniques, which is slow and uses more energy. TRC 130 is placed between network layer 122 and NIC 142. NIC 142 is a combination of link layer 144 and physical layer 146.

The key functions of the network and routing protocols are partitioned between TRC 130 and network layer 122 as to perform the functions that require flexible processing in software, and perform functions whose behaviors are simple and stable, yet sufficient to provide strong security, in TRC 130. For example, current ad hoc routing protocols such as Ad hoc On Demand Distance Vector routing (AODV) and Dynamic Source Routing (DSR), utilize TRC 130 to control forwarding and route maintenance. Moreover, TRC 130 can be used to mitigate security attacks on distance-vector (DV) and link-state protocols (LSP), which have different methods of route acquisition and maintenance. DV attacks, such as sequence number and neighbor falsification attacks, and LSP attacks, such as non-forwarding of LSP, are just a few of the attacks that TRC 130 can address.

TRC 130 comprises: Activity Log Capture (LC) 132, Activity Log Query (LQ) 134, Activity Log Reply (LR) 136, multi-hop forwarding 138, and route error management 140. The aforementioned elements provide specific functionality identified and implemented using the tamper-resistant techniques of the present invention. By implementing route maintenance and packet forwarding in TRC 130, where it is out of the control of the traditional network layer, and by using LC 132, LQ 134, and LR 136, the security improvement is profound.

Advantageously, LC 132 cannot be bypassed because the node's communication hardware cannot be accessed except via TRC 130. The log is stored in a medium that is physically isolated from components other than TRC 130. This isolation can only be compromised by physically modifying the node, which causes the cryptographic co-processor to self-destruct, thereby rendering the node unable to encrypt and authenticate its transmissions or decrypt transmissions sent to it, effectively taking it out of service. Thus LC 132 accurately records all communication activity involving the node on which it is collected.

TRC 130 logs can be queried by other nodes in the network as well. Such queries are initiated by the software layers above TRC 130. Queries are transmitted using LQ 134 messages. The format of LQ 134 messages is as follows:

| message type (4b) | sending node (48b) |
|---|---|
| log query type (4b) | target node (48b) |
| query parameters | |

LQ is encrypted by the sender so that only the target node can decrypt. A standard packet forwarding header with an optional onion-encrypted source route is added to LQ 134 messages, as will be presently disclosed in the description of FIG. 6. The use of onion encryption prevents nodes on the route from being able to determine which logs are being queried. Onion encryption can be performed at the network layer or at the TRC level. The network layer onion encryption is used only for data packets and the TRC level onion encryption may be used for data, log query and log response messages. This process requires that the network layer (or TRC) in the sender of the message has keys shared with the network layer (or TRC) of each node in the path.

When a node receives an LQ 134 message, it extracts the necessary log information, formats it as LR 136, and sends it back to the source using onion-encrypted source routing. The contents of LR 136 are encrypted end-to-end, for both confidentiality and integrity.

The information about communication actions kept in the log and made available to other nodes via log query and response is much more accurate than can be obtained by prior means. This process enables efficient and reliable detection of compromised nodes.

Multi-hop forwarding 138 can include LQ 134, LR 136, data, route reply REP, and routing error (RERR) messages. In Multi-hop forwarding 138, the source of a data packet can specify in the packet header the route to be taken, known as source routing. Alternatively, each intermediate node can determine the route based on next-hop information from its route table, known as table-driven or hop-by-hop routing. The information in the route table is managed by routing protocol 124, actual addition, modification and deleting of entries from the route table are done by TRC. The route table is read silently and autonomously by multi-hop forwarding 138. When needed, source routes can be onion encrypted, to enable each node to determine only the node to which is should relay the packet, or next hop, without knowing the packet's final destination. Multi-hop forwarding 138 functionality in TRC 130 ensures that a node with compromised (routing) software cannot selectively drop packets, as done by blackhole or grey-hole attacks.

Both types of packet forwarding can be implemented in TRC 130. If source-routing is used, then the next hop to which a packet should be forwarded is given in the packet itself, and TRC 130 has the information required to forward the packet. If table-driven routing is used, then TRC 130 uses the route table created by the routing protocol, determines the next hop, and forwards the packet. Thus, the multi-hop forwarding feature of TRC 130 ensures that messages cannot be silently dropped by intermediate nodes with compromised network software. Only when network level onion-encrypted source routing is used, network layers in intermediate nodes see the data packets passing through them. TRC 130 also maintains an Address Resolution Protocol (ARP) cache, maintained by Network layer 122 in traditional designs, to map network addresses into Media Access Control (MAC) addresses, which are needed for forwarding.

RERR management 140 leverages TRC 130 to mitigate the attacks on route maintenance as follows. Normally, link layer 144 informs network layer 122 of loss of the next hop, which triggers generation of an RERR message in many routing protocols. This RERR message may be disseminated with only the source of the route (using a point-to-point message) or with other nodes (using a broadcast message that is flooded in the network much like REQ messages). TRC 130 receives the loss-of-next-hop signal from NIC 142 and directs the routing protocol to format the RERR message with specific information.

Figure 2:
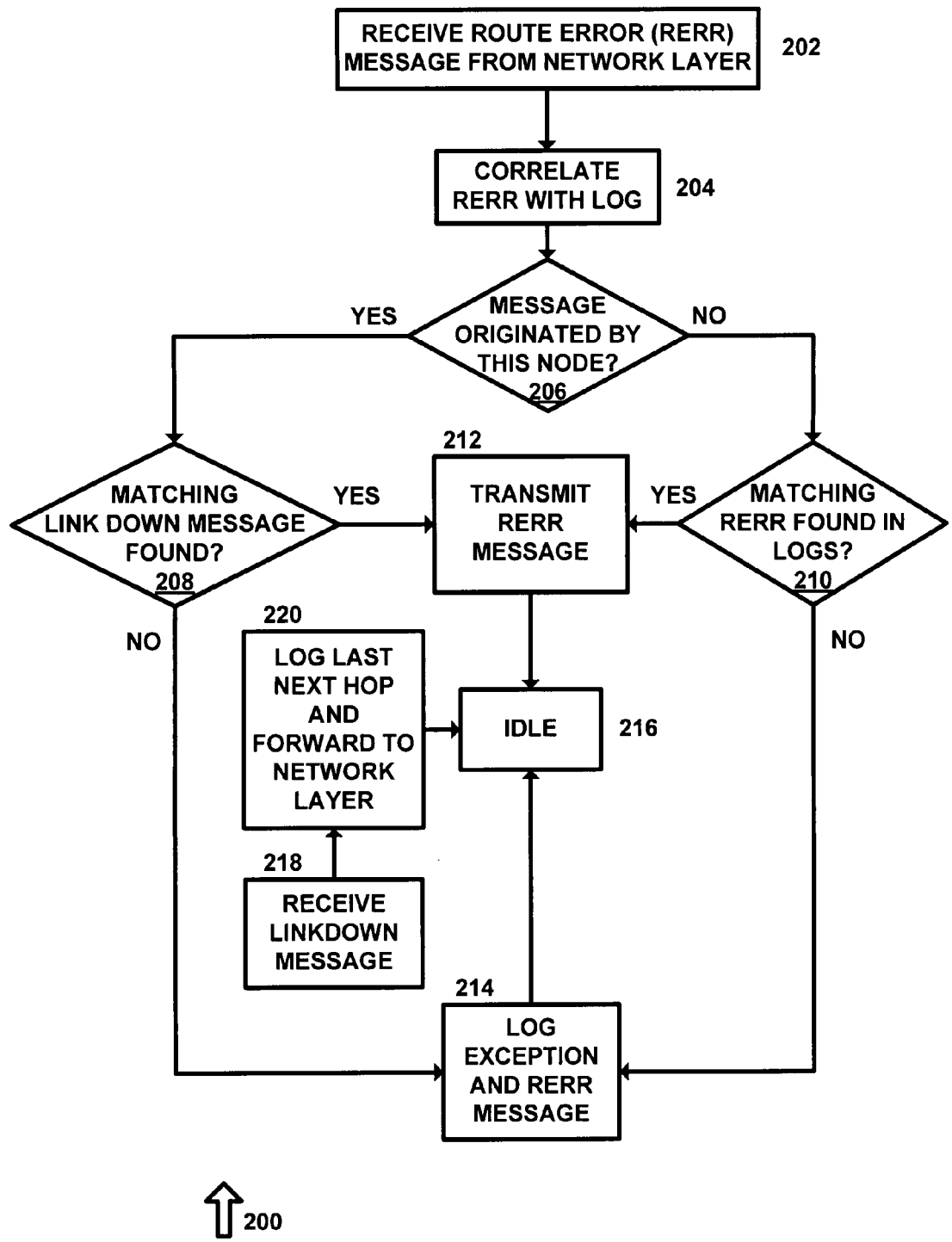
FIG. 2 is a diagram of a method for eliminating bogus route maintenance messages in accordance with an exemplary embodiment of the present invention.

Referring now to FIG. 2, there is shown at 200 a diagram of a method for eliminating bogus route maintenance messages in accordance with an exemplary embodiment of the present invention. When the routing protocol creates the RERR and sends it to TRC, the latter can check its consistency with information about the context of the error that is known to TRC and forward it to the appropriate node in the network. This process avoids sending bogus RERR messages for links that are not broken.

In addition, TRC also eliminates bogus route maintenance messages by controlling the generation of such messages. Since TRC ensures hop-by-hop authentication and multi-hop forwarding without the intervention of the routing protocol software, once the RERR message is generated correctly, it will be delivered to the intended node (or nodes) without being compromised.

Method 200 begins at 202, where the RERR is received from network layer by TRC. The method then proceeds to 204.

At 204, the received RERR message is correlated with a RERR log to verify whether or not a matching RERR exists in the RERR log. The method then proceeds to 206.

At 206, it is determined whether the message was originated by the node. If the received RERR message was generated by the node containing the TRC processing the received RERR message, the method proceeds to 208. If the received RERR message was not generated by the node containing the TRC processing the received RERR message, the method proceeds to 210.

At 208, it is determined whether a matching link-down message was found. If a matching link-down message matching the received RERR message is found in the RERR log, the method proceeds to 212. If a matching link down message matching the received RERR message is not found in the RERR log, the method proceeds to 214.

At 210, there it is determined whether a matching RERR was found in the RERR log. If the received RERR message is found in the RERR log, the method proceeds to 212. If the received RERR message is not found in the RERR log, the method proceeds to 214.

At 212, TRC allows transmission of the RERR message. The method then proceeds to 216.

At 214, an exception and the received RERR message are logged the RERR log. The method then proceeds to 216.

At 216, TRC is idle while waiting for a new event to occur.

At 218, a link down message is received from NIC by TRC. The method then proceeds to 220.

At 220, the last next hop that is known is logged and forwarded to network layer. The method then proceeds to 216.

Figure 3:
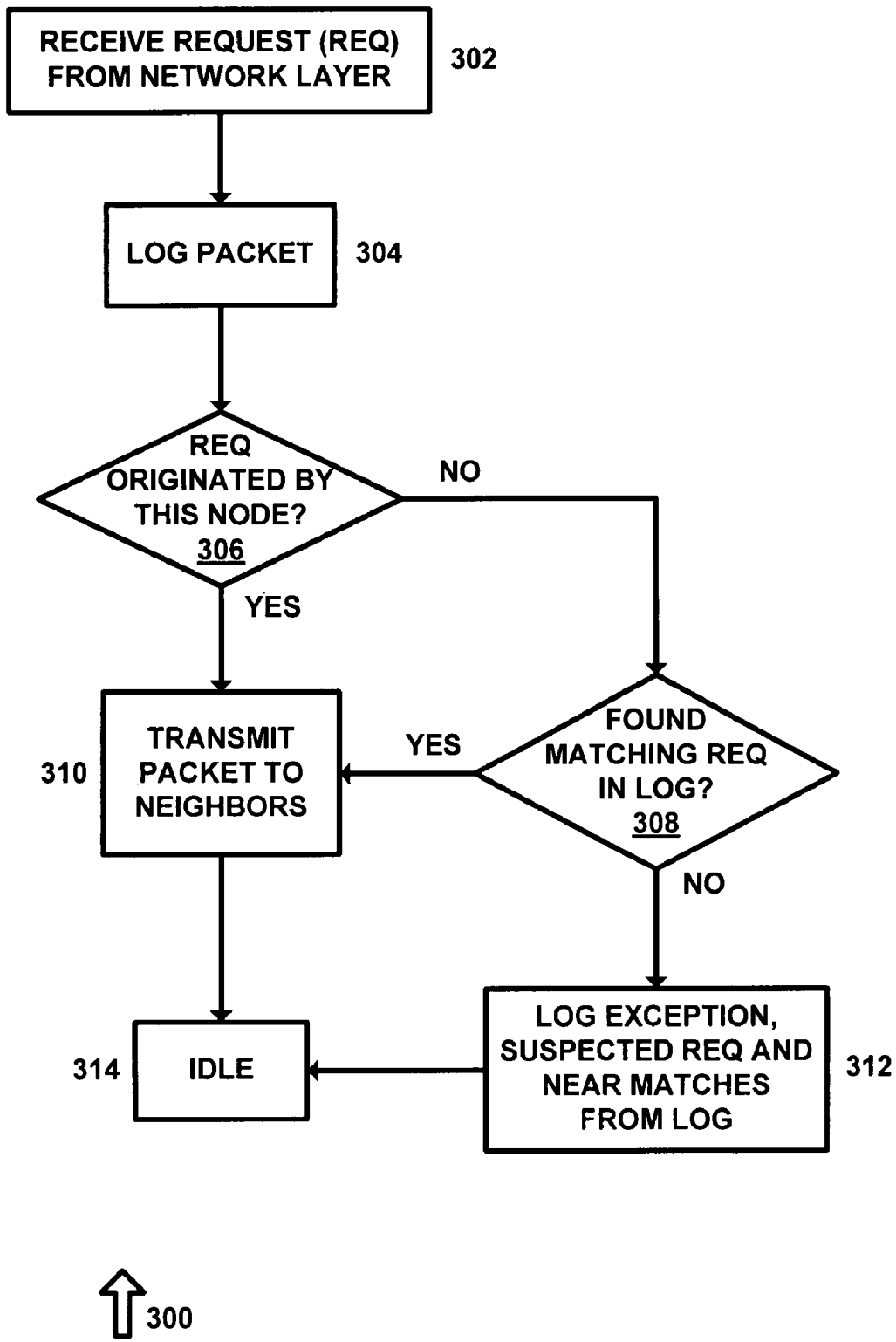
FIG. 3 is a diagram of a method for processing request control packets received from network layer in accordance with an exemplary embodiment of the present invention.

Referring now to FIG. 3, there is shown at 300 a diagram of a method for processing request (REQ) control packets received from network layer 122 in accordance with an exemplary embodiment of the present invention. In a rushing attack, the attacker attempts to include itself in routes by propagating route request packets more quickly than legitimate nodes. TRC 130 mitigates these kinds of attacks through the following method.

Method 300 begins at 302, where TRC 130 receives a route request packet from network layer 122. The method then proceeds to 304.

At 304, the received route request packet is logged. The method then proceeds to 306.

At 306, it is determined whether an REQ was originated by the node. If the REQ is originated by this node, the method proceeds to 310. If the REQ is not originated by this node, the method proceeds to 308.

At 308, it is determined whether a matching REQ was found in the log. If a matching REQ is found in the log, the method proceeds to 310. If a matching REQ is not found in the log, the method proceeds to 312.

At 310, TRC 130 allows transmission of the REQ packet to neighbors. If the routing protocol requires that forwarding of requests be delayed by a certain amount (denoted as broadcast jitter in prior art), the same may be specified by network layer at the time sending the REQ packet to TRC. TRC records this information and delays the packet by this amount and transmits it. This feature can be used to detect rushing attacks, in which corrupted routing software omits the protocol specified delays in order to make routes through them appear faster. The method then proceeds to 314.

At 312, TRC 130 logs the exception, suspected REQ, and REQ near matches from the log. The method then proceeds to 314.

At 314, TRC 130 is idle while waiting for a new event to occur.

Figure 4:
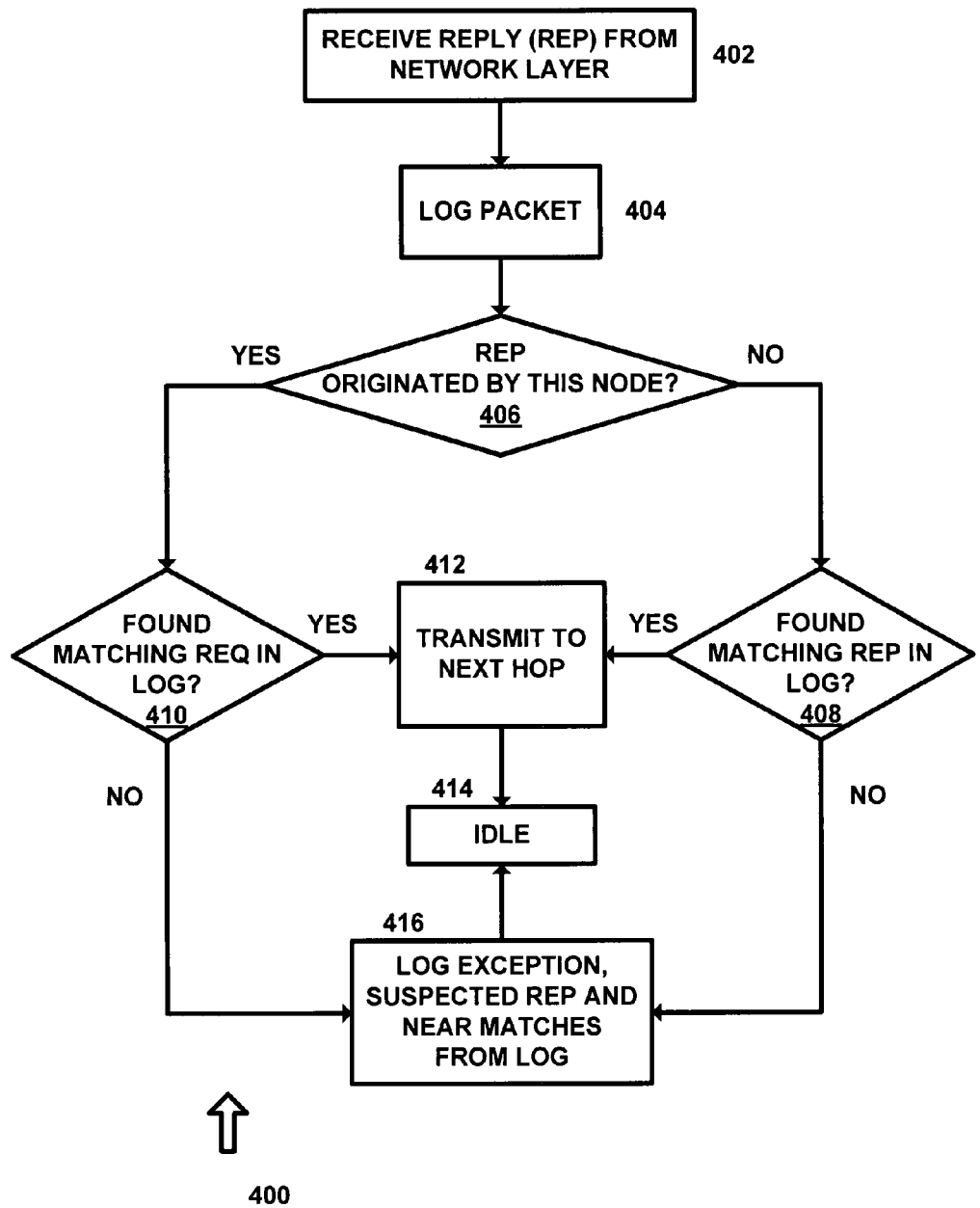
FIG. 4 is a diagram of a method for processing reply control packets received from network layer in accordance with an exemplary embodiment of the present invention.

Referring now to FIG. 4, there is shown at 400 a diagram of a method for processing reply control packets received from network layer 122 in accordance with an exemplary embodiment of the present invention. In routing-disruption attacks, the attacker attempts to alter an existing route or causes bogus routes to be formed during route discovery. TRC mitigates these kinds of attacks through the following method.

Method 400 begins at 402, where TRC receives an REP packet from network layer. The method then proceeds to 404.

At 404, the REP packet is logged. The method then proceeds to 406.

At 406, it is determined whether an REP was originated by the node. If the REP is originated by this node, the method proceeds to 410. If the REP is not originated by this node, the method proceeds to 408.

At 408, it is determined whether a matching REP was found in the log. If a matching REP indicating that network layer processing is needed is found in the log, the method proceeds to 412. If a matching REP is not found in the log, the method proceeds to 416.

At 410, it is determined whether a matching REQ was found in the log. If an REP matching the REQ is found in the log, the method proceeds to 412. If an REP matching the REQ is not found in the log, the method proceeds to 416.

At 412, TRC allows transmission of the REP packet to the next hop. The method then proceeds to 414.

At 416, TRC logs the exception, suspected REP and REQ near matches from the log. The method then proceeds to 414.

At 414, TRC is idle while waiting for a new event to occur.

Figure 5:
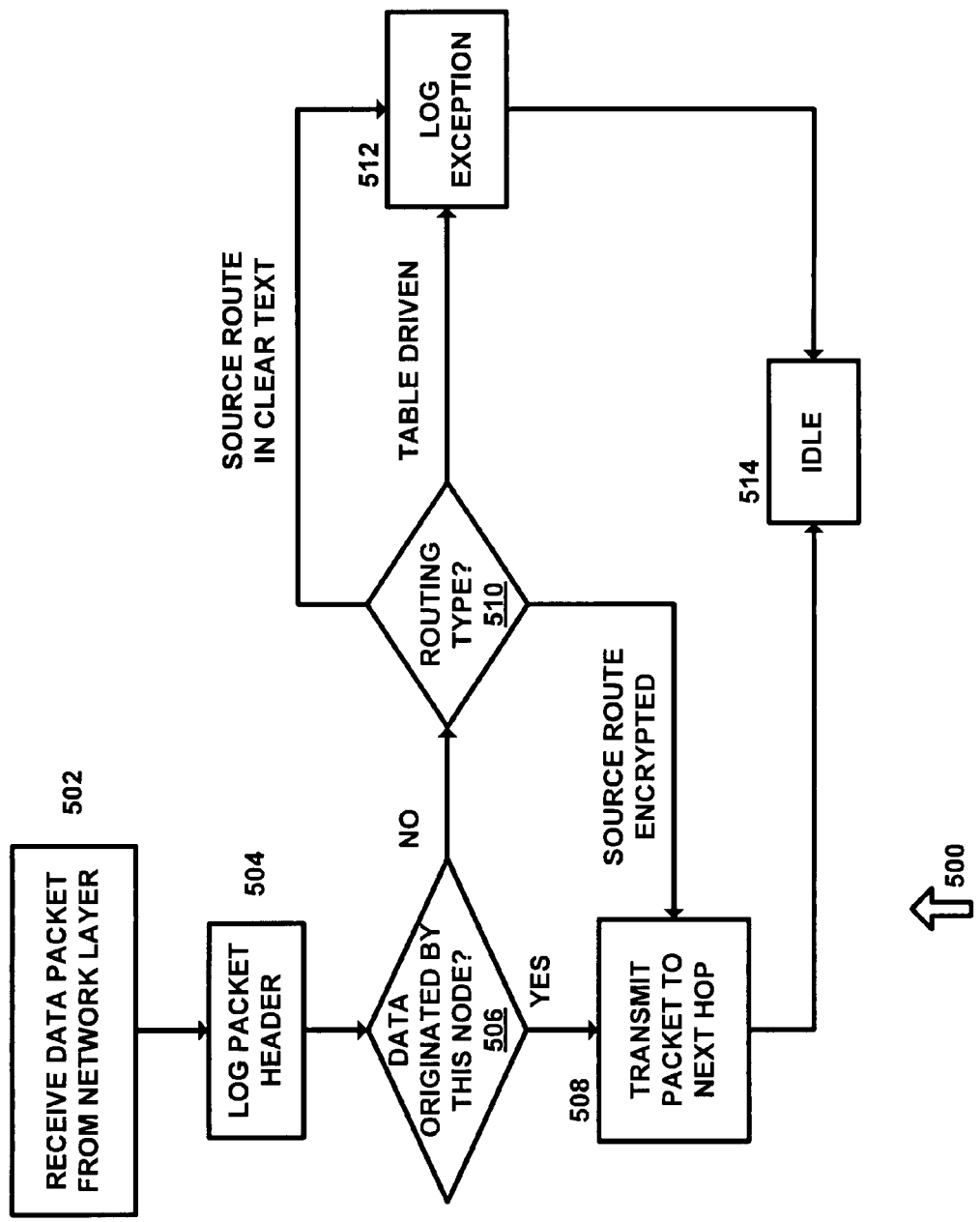
FIG. 5 is a diagram of a method for processing data packets received from network layer in accordance with an exemplary embodiment of the present invention.

Referring now to FIG. 5, there is shown at 500 a diagram of a method for processing data packets received from network layer in accordance with an exemplary embodiment of the present invention.

Method 500 begins at 502, where TRC receives a data packet from network layer. The method then proceeds to 504.

At 504, the data packet header is logged. The method then proceeds to 506.

At 506, there is shown a data packet originated by this node decision block. If the data packet is originated by this node, the method proceeds to 508. If the data packet is not originated by this node, the method proceeds to 510.

At 508, the data packet is transmitted to the next hop. The method then proceeds to 514.

At 510, a routing type is determined. If source route in clear text routing is used, the method proceeds to 512. If table driven routing is used, the method proceeds to 512. If source route encrypted routing is used, the method proceeds to 508.

At 512, the exception is logged. The method then proceeds to 514.

At 514, TRC is idle while waiting for a new event to occur.

Figure 6:
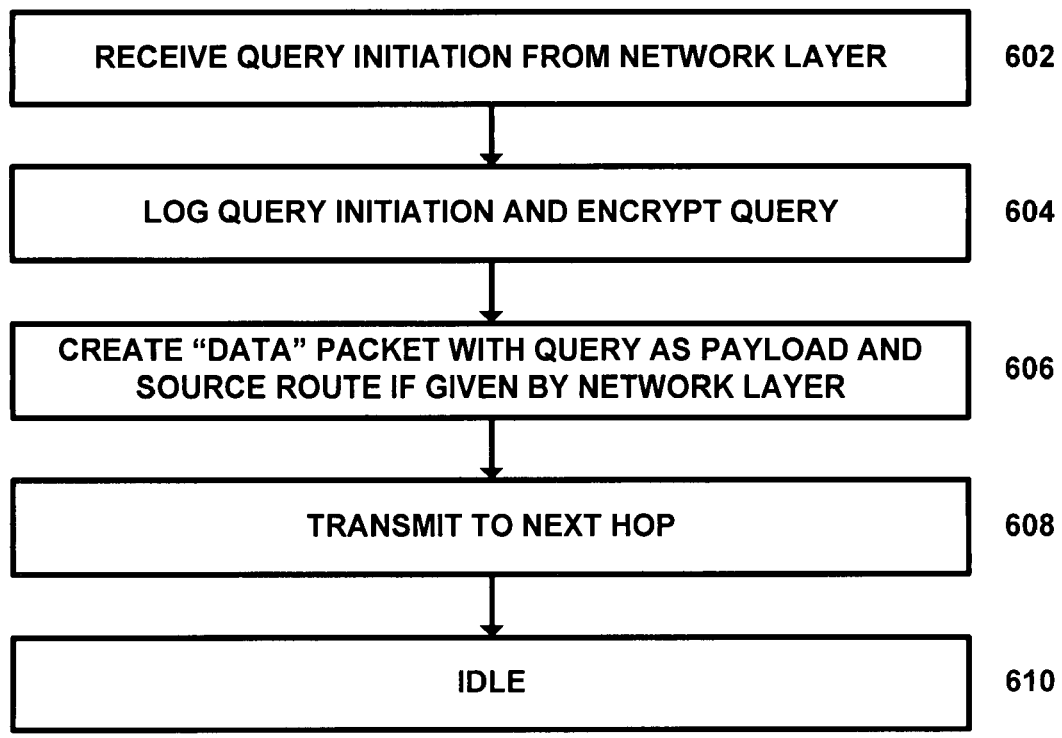
FIG. 6 is a diagram of a method for processing a log query received from network layer in accordance with an exemplary embodiment of the present invention.

Referring now to FIG. 6, there is shown at 600 a diagram of a method for processing a log query received from network layer in accordance with an exemplary embodiment of the present invention. TRC can provide high assurance of the accuracy of log data by automatically collecting log data concerning its own activities, executing queries, by generating responses to them in the proposed tamper-resistant communication layer, which cannot be compromised or bypassed by the node's other components.

Method 600 begins at 602, where TRC receives a query initiation from network layer. The method then proceeds to 604.

At 604, TRC initiates LQ and encrypts LQ. The method then proceeds to 606.

At 606, TRC creates a "data" packet with LQ as payload and source routes the "data" packet if the LQ was received from the network layer. If the network layer specified source route and provided the same, then TRC places the source route in the packet header. Onion encryption may be used if specified by the network layer. With source routing, the complete path is included as part of query parameter so that the destination TRC can use this path in reverse to source route its log response. The entire payload is encrypted using the key shared between the source and destination TRCs. The method then proceeds to 608.

At 608, TRC allows transmission of the "data" packet to the next hop. The method then proceeds to 610.

At 610, TRC is idle while waiting for a new event to occur.

Figure 7:
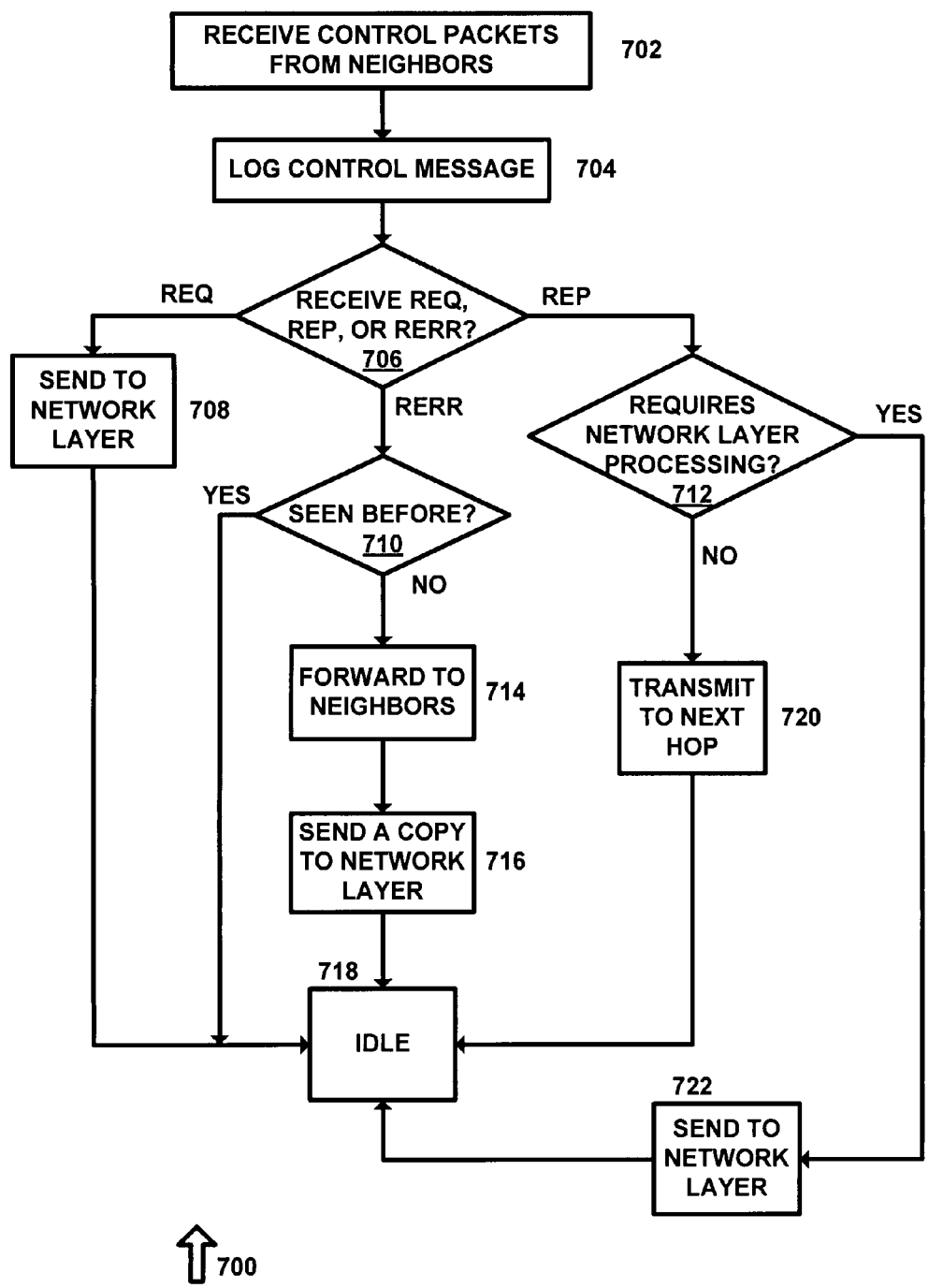
FIG. 7 is a diagram of a method for processing control packets received from neighboring nodes in an ad hoc network in accordance with an exemplary embodiment of the present invention.

Referring now to FIG. 7, there is shown at 700 a diagram of a method for processing control packets received from neighboring nodes in an ad hoc network in accordance with an exemplary embodiment of the present invention.

Method 700 begins at 702, where TRC receives a control packet from a neighbor in the ad hoc network. In one exemplary embodiment, the control packet can contain an REQ, REP, or RERR message. The method then proceeds to 704.

At 704, the control packet is logged. The method then proceeds to 706.

At 706, it is determined whether an REQ, REP, or RERR has been received. If an REQ message is received, the method proceeds to 708. If an REP message is received, the method proceeds to 712. If a RERR message is received, the method proceeds to 710.

At 708, the REQ message is sent to network layer. The method then proceeds to 718.

At 710, it is determined whether the RERR has been seen before. If the RERR was seen before, the method proceeds to 718. If the RERR was not seen before, the method proceeds to 714.

At 712, it is determined whether network layer processing is required. If the REP control packet is destined to this node or requires network layer processing, the method proceeds to 722. If the received REP message was not destined to this node and does not require network layer processing, the method proceeds to 720.

At 714, TRC automatically forwards point-to-point RERR messages from neighboring nodes using multi-hop forwarding. For broadcast-type RERR messages, TRC automatically forwards them using standard broadcast techniques to prevent broadcast storm. This processing avoids suppression of legitimate RERR messages passing through malicious nodes with corrupt network layer software. The method then proceeds to 716.

At 716, a copy of the RERR message is sent to network layer for processing. The method then proceeds to 718.

At 722, the received REP message is sent to network layer. The method then proceeds to 718.

At 720, the received REP message is transmitted to the next hop. The method then proceeds to 718.

At 718, TRC is idle while waiting for a new event to occur.

Figure 8:
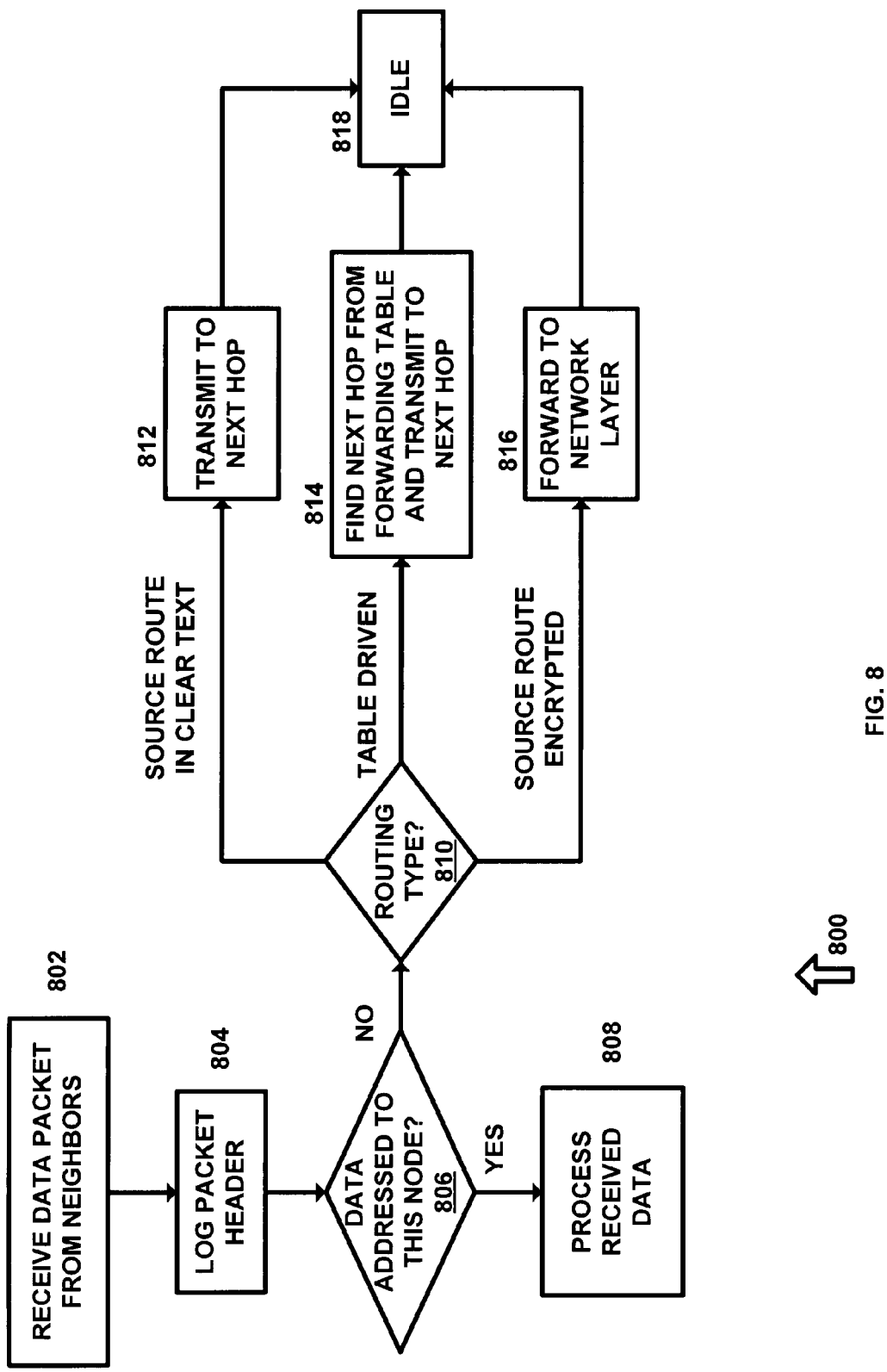
FIG. 8 is a diagram of a method for processing data packets from neighboring nodes in an ad hoc network in accordance with an exemplary embodiment of the present invention.

Referring now to FIG. 8, there is shown at 800 a diagram of a method for processing data packets received from neighboring nodes in an ad hoc network in accordance with an exemplary embodiment of the present invention. All communication from other nodes must be passed to TRC. TRC forwards external messages to its software protocol stack only if it determines that the messages are meant for this node. It logs all messages, control packets in their entirety and data packet headers, passed to network layer.

Method 800 begins at 802, where TRC receives a data packet from a neighbor in the ad hoc network. The method then proceeds to 804.

At 804, the received data packet header is logged. The method then proceeds to 806.

At 806, it is determined whether a data packet was addressed to this node decision block. If the data packet is addressed to this node, the method proceeds to 808. If the data packet is not addressed to this node, the method proceeds to 810.

Figure 9:
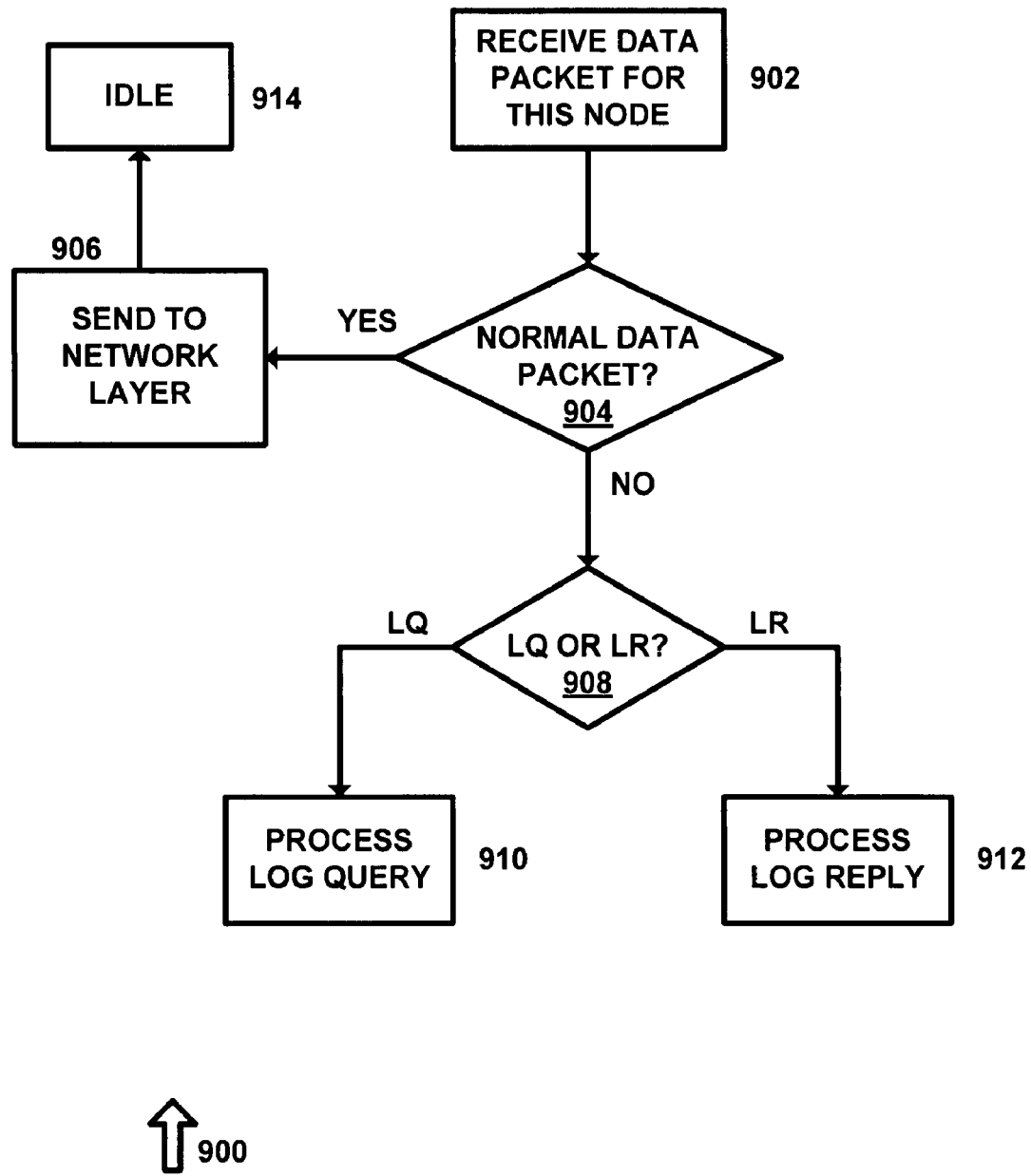
FIG. 9 is a diagram of a method for processing data packets intended for a receiving node in accordance with an exemplary embodiment of the present invention.

At 808, TRC allows processing of the received data packet, as will be presently disclosed by FIG. 9.

At 810, a routing type decision is made. If source route in clear text routing is used, the method proceeds to 812. If table driven routing is used, the method proceeds to 814. If source route encrypted routing is used, the method proceeds to 816.

At 812, TRC allows transmission of the received data packet to the next hop. The method then proceeds to 818.

At 814, TRC determines the next hop from the routing table and allows transmission of the received data packet to the next hop. Normally in table-driven routing, source node has little control over the next hops used by intermediate nodes to forward its data. As will be presently disclosed by FIG. 12, the exemplary embodiment requires that route entries be marked with unique reply numbers. The source of a data packet can indicate this reply number to control the route taken by its packet without specifying the actual route itself. In such a case, the multi-hop forwarding in TRC will use only the next hop specified by the route with the source specified unique reply number. The method then proceeds to 818.

At 816, TRC allows transmission of the received data packet to network layer. The method then proceeds to 818.

At 818, TRC is idle while waiting for a new event to occur.

Referring now to FIG. 9, there is shown at 900 a diagram of a method for processing data intended for a receiving node in accordance with an exemplary embodiment of the present invention.

Method 900 begins at 902, where TRC receives a data packet intended for this node. The method then proceeds to 904.

At 904, it is determined whether a normal data packet has been received. If the received data packet is normal, the method proceeds to 906. If the received data packet is not normal, the method proceeds to 908.

At 906, the received data packet is sent to network layer. The method then proceeds to 914.

At 908, it is determined whether an LQ or LR message has been received. If the received data packet contains activity log query (LQ) message, the method proceeds to 910. If the received data packet contains an activity log reply (LR) message, the method proceeds to 912.

Figure 10:
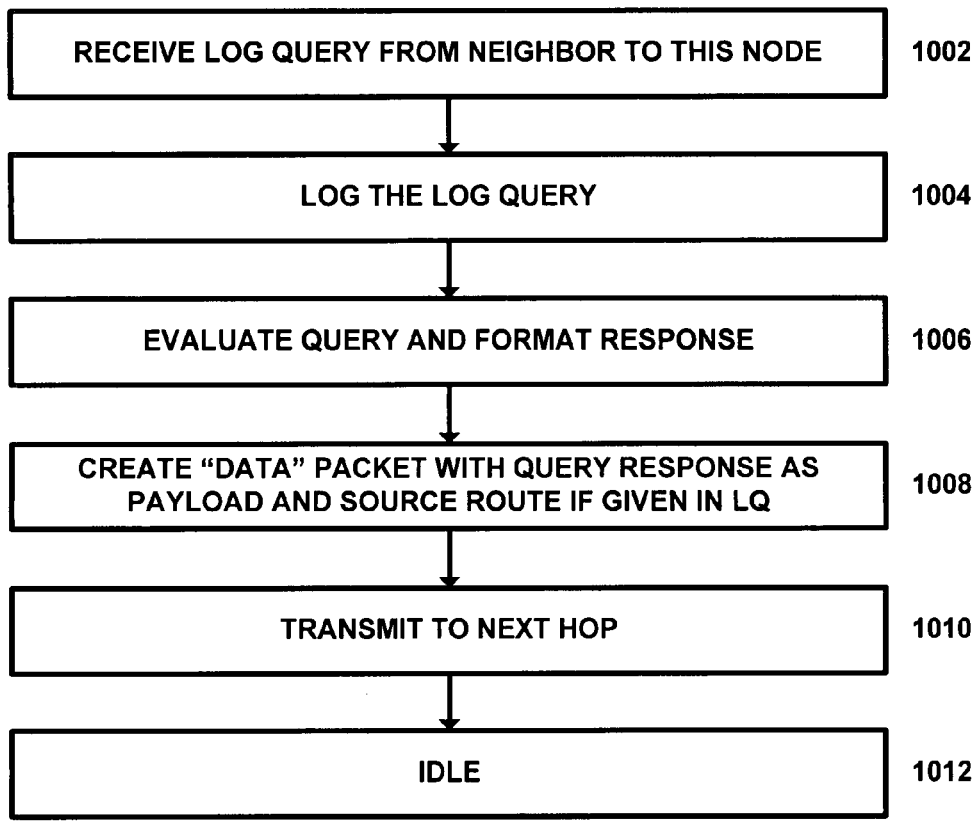
FIG. 10 is a diagram of a method for processing a log query received from neighboring nodes in an ad hoc network in accordance with an exemplary embodiment of the present invention.

At 910, TRC processes LQ, as will be presently disclosed in the description of FIG. 10.

Figure 11:
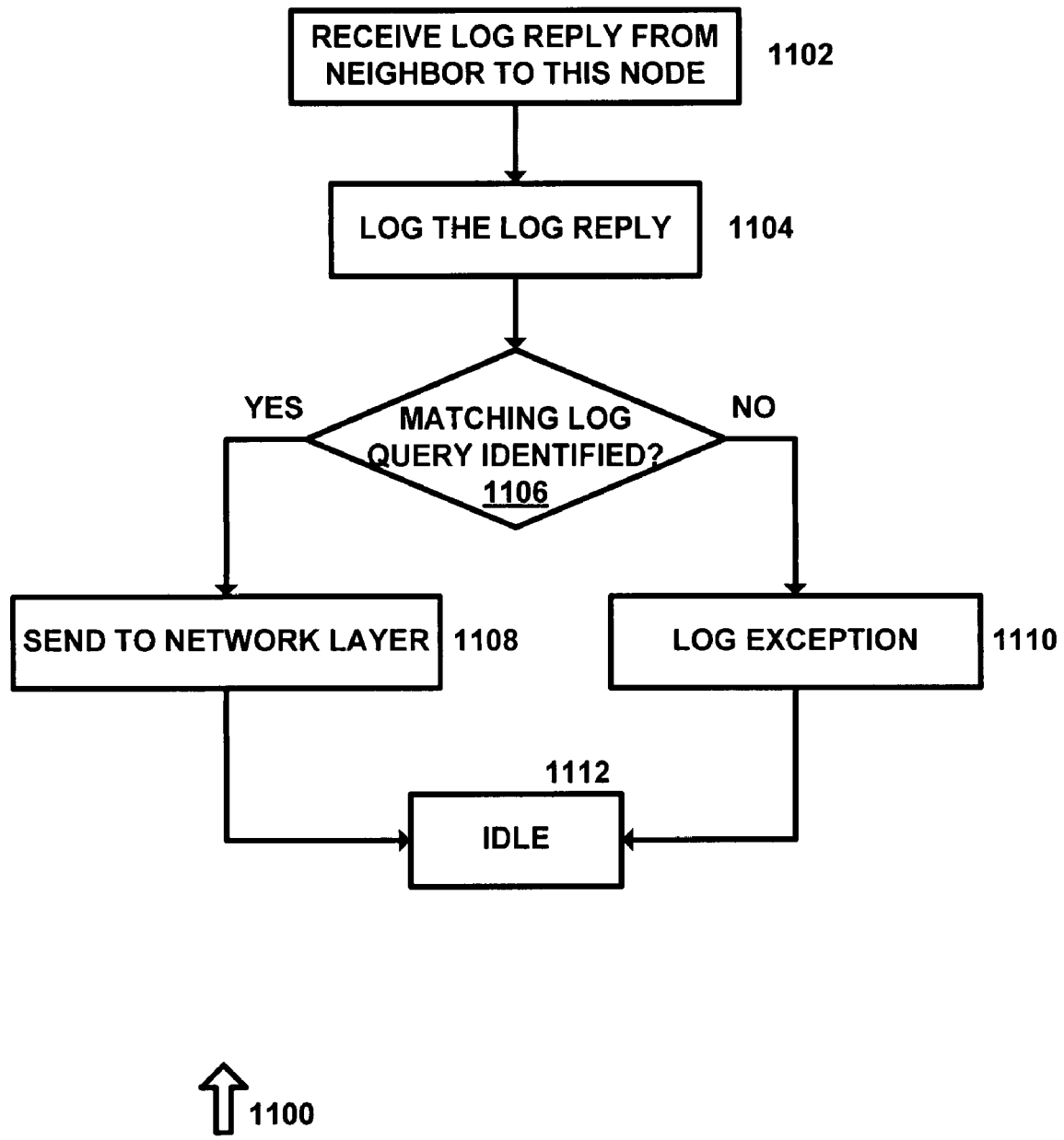
FIG. 11 is a diagram of a method for processing a log reply received from neighboring nodes in an ad hoc network in accordance with an exemplary embodiment of the present invention.

At 912, TRC processes LR, as will be presently disclosed in the description of FIG. 11.

At 914, TRC is idle while waiting for a new event to occur.

Referring now to FIG. 10, there is shown at 1000 a diagram of a method for processing a log query received from neighboring nodes in an ad hoc network in accordance with an exemplary embodiment of the present invention. TRC also logs all transmission activities, be it generated by network layer or occurring entirely within TRC, and all interactions between the layers, including commands issued by network layer to TRC. All communication initiated by node's software, network layer and above, must pass through TRC in order to be transmitted to other nodes. TRC logs all commands, control packets from the routing protocol, and headers of all other packets in its secure log capture mechanism.

Method 1000 begins at 1002, where TRC receives log query (LQ) from a neighbor in the ad hoc network addressed to this node. The method then proceeds to 1004.

At 1004, LQ is logged. The method proceeds to 1006.

At 1006, TRC evaluates LQ received from neighbor and formats an appropriate response LR. The method then proceeds to 1008.

At 1008, TRC creates a "data" packet with LR as payload. Source route will be specified if the received LQ contains one. Otherwise, table-driven routing may be used. The method then proceeds to 1010.

At 1010, TRC allows transmission of the "data" packet to the next hop. The method then proceeds to 1012.

At 1012, TRC is idle while waiting for a new event to occur.

Referring now to FIG. 11, there is shown at 1100 a method for processing a log reply received from neighboring nodes in an ad hoc network in accordance with an exemplary embodiment of the present invention.

Method 1100 begins at 1102, where TRC receives an LR message from a neighbor in the ad hoc network addressed to this node. In one exemplary embodiment, LR is from a laptop. The method then proceeds to 1104.

At 1104, LR is logged. The method proceeds to 1106.

At 1106, it is determined whether a matching log query has been identified. If an LQ matching LR is identified, the method proceeds to 1108. If an LQ matching LR is not identified, the method proceeds to 1110.

At 1108, TRC sends LR to network layer. The method then proceeds to 1112.

At 1110, TRC logs an exception. The method then proceeds to 1112.

At 1112, TRC is idle while waiting for a new event to occur.

Figure 12:
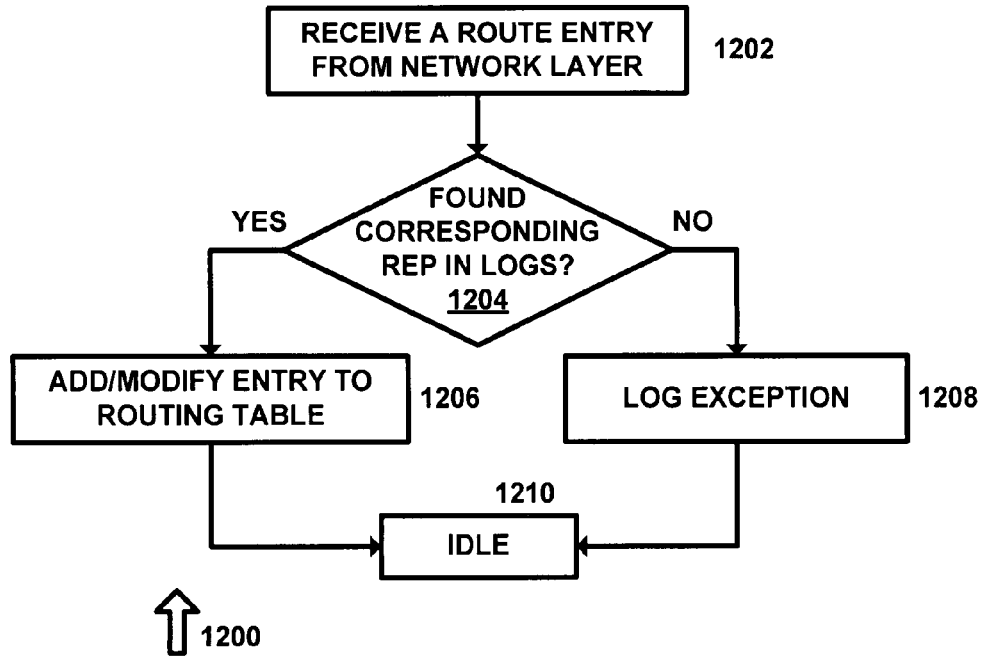
FIG. 12 is a diagram of a method for preventing a unauthorized route table entry in accordance with an exemplary embodiment of the present invention.

Referring now to FIG. 12, there is shown at 1200 a method for preventing an unauthorized route table entry in accordance with an exemplary embodiment of the present invention. To detect falsification of route entries by intermediate nodes, the modification of route entries need to be TRC events for table-driven message forwarding. Therefore, only TRC is allowed to add and delete entries from the routing table. Routing protocol gives the information that needs to be added or deleted from the routing table. The network layer (routing protocol) can read the routing table directly. Additionally, TRC can read the routing table independently, without involving network layer.

To add and/or modify a route table entry, the network layer indicates a reply number that caused the route change, destination, next hop, and other necessary information. A reply number is a unique number given by the destination that generated the REP message. TRC checks the reply number, destination, and next hop for correctness. The source of a data message can control route taken by its messages even in table-driven forwarding by indicating the reply number corresponding to the route of its choice.

Method 1200 begins at 1202, where TRC receives a route entry request from network layer. The method then proceeds to 1204.

At 1204, it is determined whether a corresponding REP has been found in the logs. If a corresponding REP is found in the logs, the method proceeds to 1206. If a corresponding REP is not found in the logs, the method proceeds to 1208.

At 1206, TRC authorizes route table entry and/or modification. The method then proceeds to 1210.

At 1208, TRC logs an exception. The method then proceeds to 1210.

At 1210, TRC is idle while waiting for a new event to occur.

Figure 13:
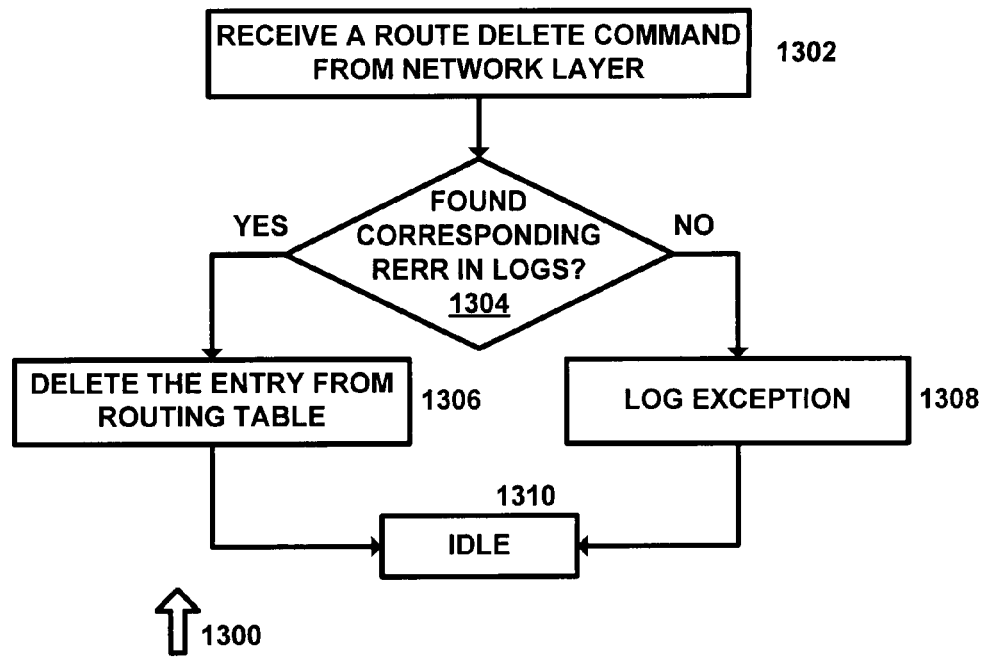
FIG. 13 is a diagram of a method for preventing a unauthorized route table deletion in accordance with an exemplary embodiment of the present invention.

Referring now to FIG. 13, there is shown at 1300 a method for preventing an unauthorized route table deletion in accordance with an exemplary embodiment of the present invention.

Method 1300 begins at 1302, where TRC receives a route deletion request from network layer. The method then proceeds to 1304.

At 1304, it is determined whether a corresponding RERR was found in the logs. If a corresponding RERR is found in the logs, the method proceeds to 1306. If a corresponding RERR is not found in the logs, the method proceeds to 1308.

At 1306, TRC authorizes deletion of a route table entry. The method then proceeds to 1310.

At 1308, TRC logs an exception. The method then proceeds to 1310.

At 1310, TRC is idle while waiting for a new event to occur.

TRC can ensure that the entries provided by other routing protocols, such as destination sequenced distance vector (DSDV), to modify the routing table are consistent with the DV updates it received recently. TRC can take snapshots of the routing table and provide the snapshots to other querying nodes with appropriate security privilege. TRC can also check inconsistencies, such as nodes that it did not hear directly cannot be neighbors in the routing table.

TRC can be implemented in hardware, or a suitable combination of hardware and software and which could be one or more software systems upgrading on a general purpose processing platform.

As used herein, hardware can include discrete semiconductor devices, an application-specific integrated circuit, a field programmable gate array, a general purpose processing platform, or other suitable devices. Software can include one or more objects, agents, threads, lines of code, subroutines, separate software applications, user-readable (source) code, machine-readable (object) code, two or more lines of code in two or more corresponding software applications, databases, or other suitable software architectures. In one exemplary embodiment, software can include one or more lines of code in a general purpose software application, such as an operating system, and one or more lines of code in a specific purpose software application.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. A system for tamper-resistant communication in a network node, comprising:
a log capture system residing in a tamper-resistant communication layer storing message statistics and message data including node communication activity data with other nodes in a network passing through the tamper-resistant communication layer in a data memory device disposed between a network layer and a link layer of a network protocol stack;
a log query system residing in the tamper-resistant communication layer, and electronically requesting node communication activity data from the log capture system, the log query system determines whether a query by other node in the network is related to the node communication activity data stored in the log capture system;
a log reply system residing in the tamper-resistant communication layer, and electronically transmitting node communication activity data in response to a query by the log query system, the log reply system determines whether transmission of the node communication activity data is responsive to the query;
a multi-hop forwarding system residing in the tamper-resistant communication layer, and detecting whether the message data has been dropped by one or more intermediate nodes in the network; and
a route error management system residing in the tamper-resistant communication layer, and analyzing a route error message generated by a routing protocol, and forwarding the route error message to one or more nodes in the network.

2. The system of claim 1, wherein the multi-hop forwarding system determines whether route data associated with the message data has been modified by one or more intermediate nodes.

3. A method for eliminating bogus messages between nodes in an ad hoc wireless network, comprising:
electronically preventing the generation of bogus route maintenance messages with a tamper-resistant communication layer;

querying a log capture system residing in the tamper-resistant communication layer and determining whether a route maintenance message is related to route maintenance messages stored in the log capture system;

forwarding by the tamper-resistant communication layer the route maintenance message to the appropriate node in the network after determining by the tamper-resistant communication layer whether forwarding of the route maintenance message is responsive to the query;

ensuring hop-by-hop authentication of the route maintenance message; and ensuring multi-hop forwarding of the route maintenance message;

wherein the hop-by-hop authentication and the multi-hop forwarding are performed by the tamper-resistant communication layer without the intervention of a routing protocol.

4. A system for tamper-resistant communication in a node in an ad hoc network, comprising:

means for storing message data residing in a tamper-resistant communication layer including node communication activity data with other nodes in the ad hoc network passing through the tamper-resistant communication layer disposed between a network layer and a link layer of a network protocol stack;

means for query residing in the tamper-resistant communication layer for requesting node communication activity data from the means for storing message data, the means for query determines whether a query by other node in the network, for the message data is related to the node communication activity data stored in the means for storing message data;

means for reply residing in the tamper-resistant communication layer for determining whether transmission of the node communication activity data is responsive to the query, the means for reply electronically transmitting the node communication activity data in response to the query;

means residing in the tamper-resistant communication layer for detecting whether the message data has been dropped by one or more intermediate nodes in the network; and means residing in the tamper-resistant communication layer for analyzing a route error message generated by a routing protocol, and forwarding the route error message to one or more nodes in the network.

5. The system of claim 4, further comprising means for detecting whether the message data has been modified by an intermediate node in a network.

6. The system of claim 4, further comprising means for preventing injection of a bogus route error message.

7. The system of claim 5, further comprising means for preventing the message data from being silently dropped by one or more intermediate nodes in the network.

* * * * *